UNITED STATES PATENT OFFICE.

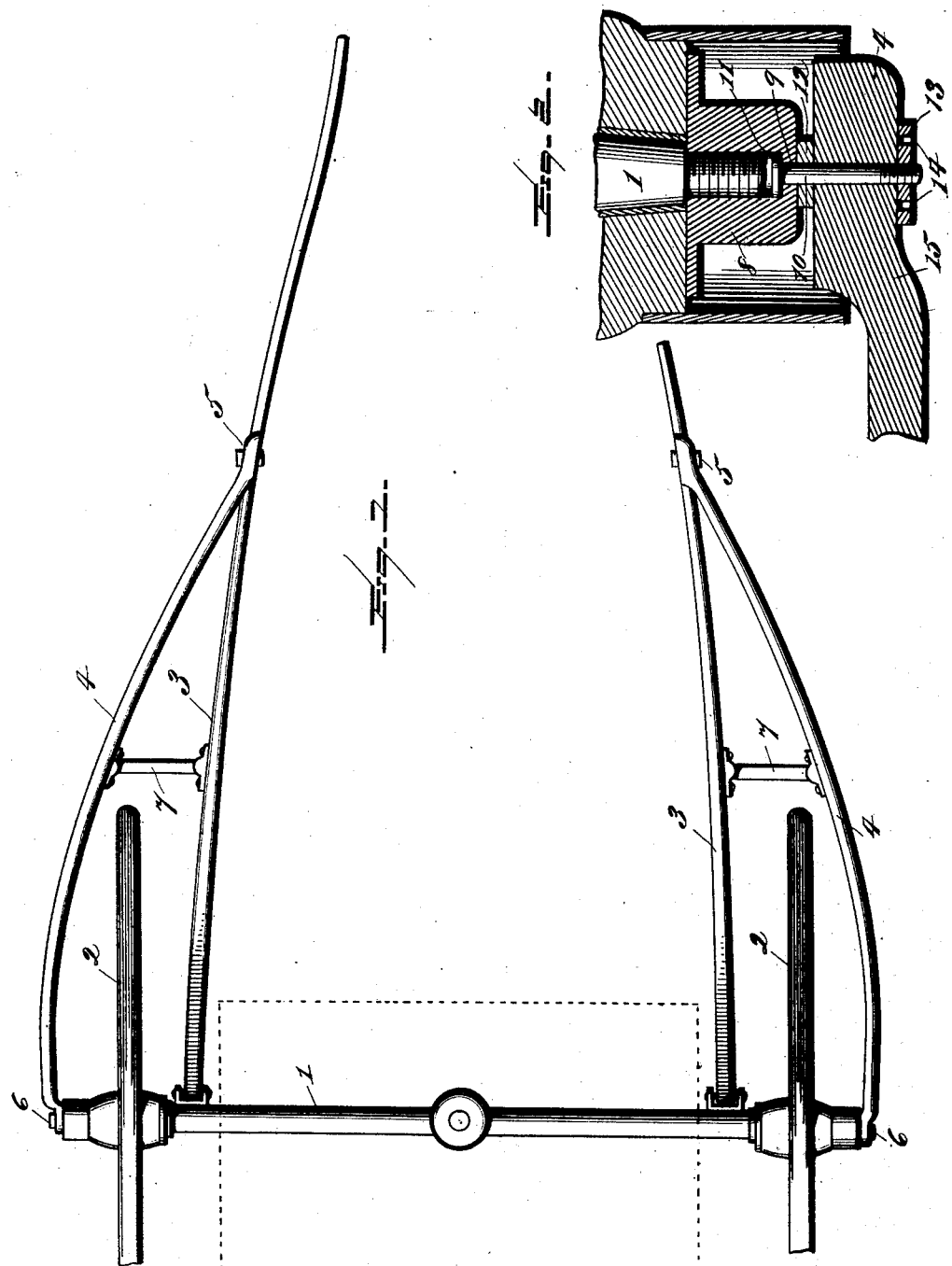

WILLIAM WALTER METTE, OF AIKEN, SOUTH CAROLINA.

VEHICLE ATTACHMENT.

SPECIFICATION forming part of Letters Patent No. 715,109, dated December 2, 1902.

Application filed September 19, 1902. Serial No. 124,076. (No model.)

*To all whom it may concern:*

Be it known that I, WILLIAM WALTER METTE, a citizen of the United States, residing at Aiken, in the county of Aiken and State of South Carolina, have invented certain new and useful Improvements in Vehicle Attachments; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to carriages and wagons, but more particularly to a guard or fender therefor, and has for its object to provide a device which will protect the front wheels, shafts, and axle of a vehicle from damage by reason of striking obstacles.

A further object of my invention is to provide a device for protecting the front wheels, shafts, and axle of a vehicle against damage in case of a runaway.

A further object of my invention is to provide a device which will protect the shafts and which strengthens and braces them at all times.

With all these objects in view my invention consists in providing the shafts of a vehicle with an outward and rearwardly extending guard or fender.

My invention also consists in the manner of attaching the same to the axle and also in certain other novel features of constructions and in combination of parts, which will be first fully described and afterward specifically pointed out in the appended claims.

Referring to the accompanying drawings, Figure 1 is a plan view of a pair of shafts, front wheels, and axle provided with my invention. Fig. 2 is a horizontal section of the outer end of the hub and axle, showing manner of attaching my device.

Like numerals of reference indicate the same parts throughout both the figures, in which—

1 is the axle, and 2 the wheels.

3 indicates the shafts, attached to the axle in the usual manner.

4 indicates my guard or fender securely bolted to the shafts at 5 and extending outwardly and rearwardly to the axle, where it is attached at 6.

7 indicates a central brace secured to the shaft for the purpose of strengthening the guard or fender and shafts. It might be necessary to provide a turnbuckle on this brace in order to more accurately adjust the guard or fender to the shafts.

Referring now to Fig. 2, it will be seen that I provide the axle-nut 8 with a small hole 9 in the end thereof and insert a small pin or bolt 10, provided with a flat head 11, so as not to interfere with the end of the axle. I next run on said pin 10 a jam-nut or washer 12 in order to hold the guard or fender 4 out of engagement with the hub. The guard or fender is then slipped on the pin 10, and a round nut 13 is then threaded on said pin or bolt by means of a forked wrench, the holes or openings 14 therefor being shown. The rear end of the guard or fender is offset a trifle at 15 in order to protect the nut 14 and also to allow free movement of the wheel.

Having thus set forth my invention, its operation is obvious, as it is clearly seen that no obstacle can come in contact with the wheels or axle, as the guard or fender will strike it and cause the vehicle to swerve out of the way. This is particularly useful in cases of runaway, as it is the front wheels and axle that suffer most then by reason of the vehicle striking obstructions—such as posts, fences, &c.—thereby smashing the wheels and breaking the axle. The guard or fender also has a tendency to throw the horse when striking an obstacle with great force, as in cases of runaway, by throwing the shaft suddenly against the horse.

Having thus fully described my invention, I do not wish to be understood as limiting myself to the exact construction set forth, as various slight changes may be made therein without departing from the spirit of my invention, and I consider myself clearly entitled to all changes and modifications that fall within the limit and scope of the following claims.

What I claim as new, and desire to secure by Letters Patent of the United States, is—

1. The combination with the shafts and axle of a vehicle of a guard or fender secured to the shaft at its forward end, and to the axle at its rear end by independent means passing horizontally through the axle-nut.

2. The combination with the shaft and axle of a vehicle, of a guard or fender secured to the shaft at its forward end, independent means passing horizontally through the axle-nut for securing the rear end of the guard or fender, and a brace intermediate the two ends of said fender.

3. The combination with the shafts and axle of a vehicle of a guard or fender secured to the shaft at its forward end, the axle-nut provided with an opening therein, a pin passing through said opening and entering the rear end of said guard or fender, and means for securing said guard or fender to said pin.

In testimony whereof I affix my signature in presence of two witnesses.

WILLIAM WALTER METTE.

Witnesses:
M. M. PAUL,
J. M. RICHARDSON.